Feb. 20, 1934.    S. J. LONERGAN    1,947,606
WATER HEATED FLUE
Filed Oct. 17, 1929    6 Sheets-Sheet 1
Fig.1.
Fig.2.
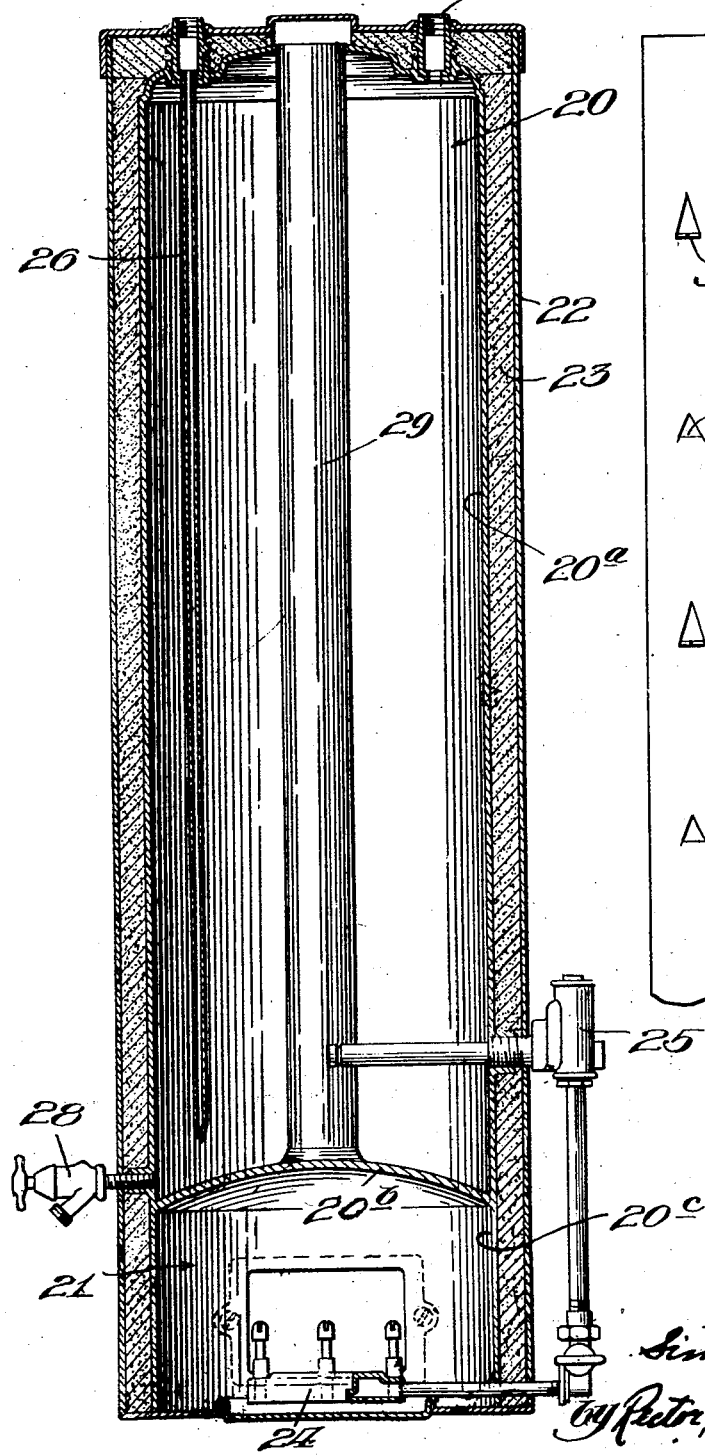
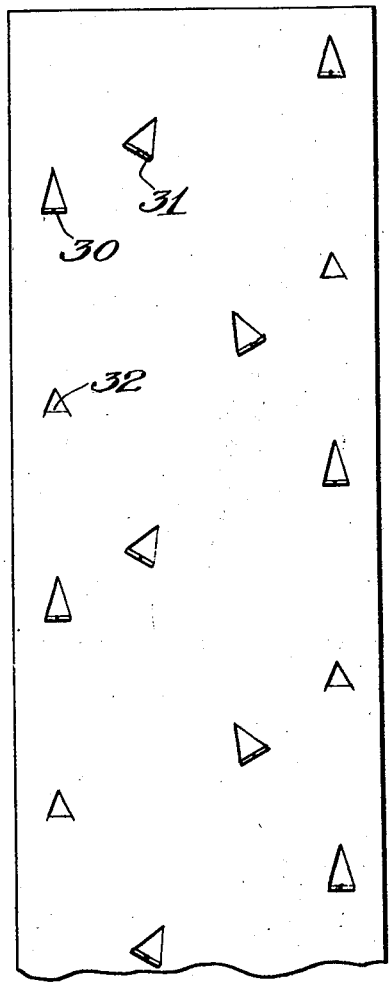

Feb. 20, 1934.  S. J. LONERGAN  1,947,606
WATER HEATED FLUE
Filed Oct. 17, 1929    6 Sheets-Sheet 2
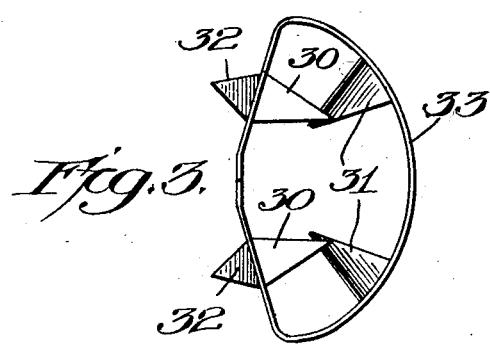
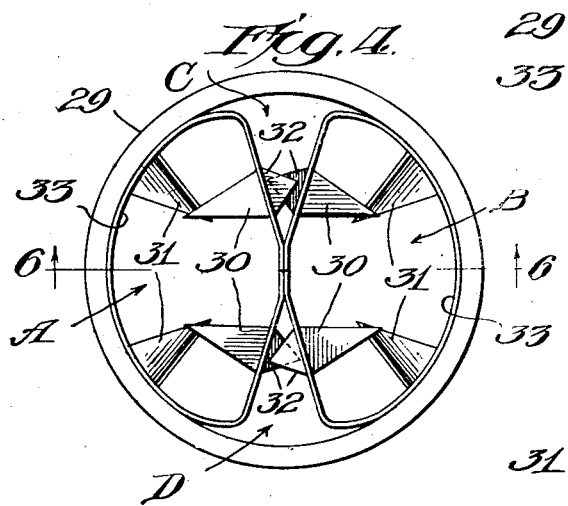
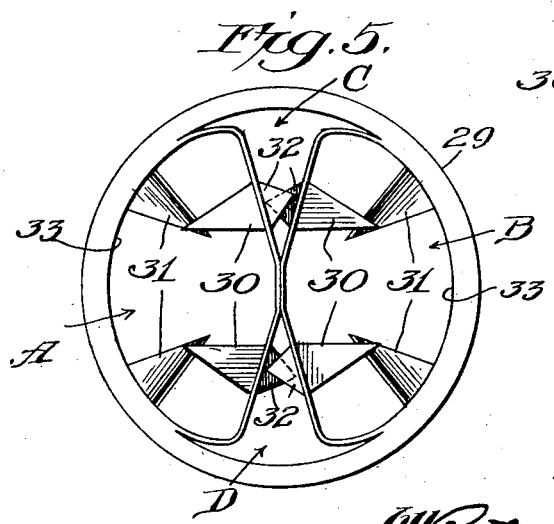
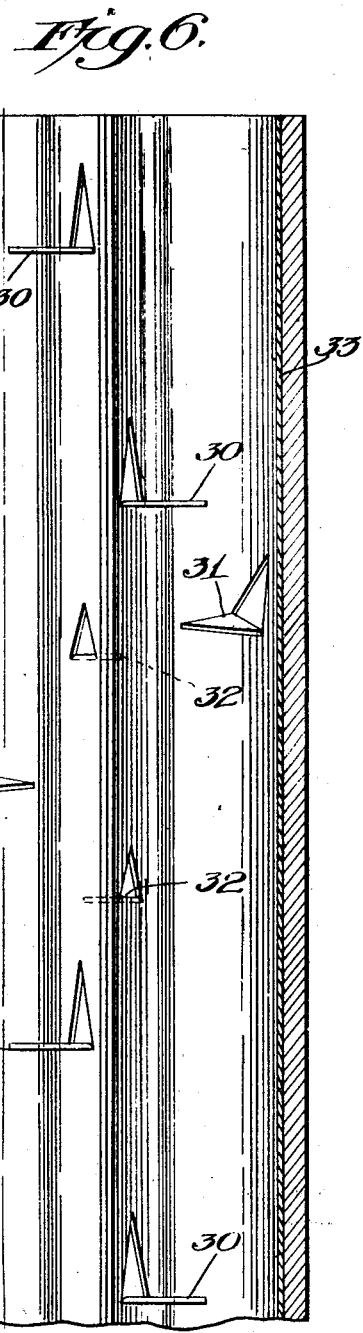

Feb. 20, 1934.  S. J. LONERGAN  1,947,606
WATER HEATED FLUE
Filed Oct. 17, 1929   6 Sheets-Sheet 3

Feb. 20, 1934.                 S. J. LONERGAN                1,947,606
                              WATER HEATED FLUE
                         Filed Oct. 17, 1929    6 Sheets-Sheet 4
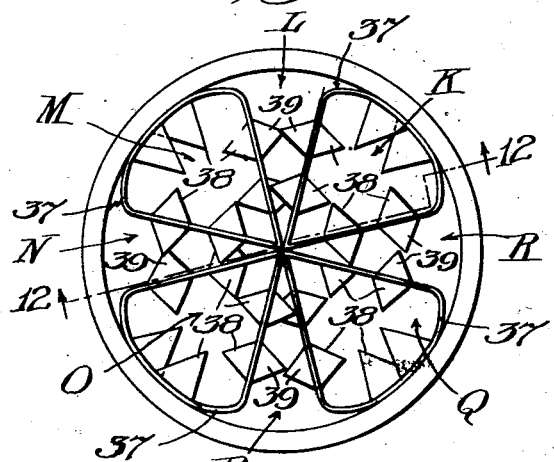
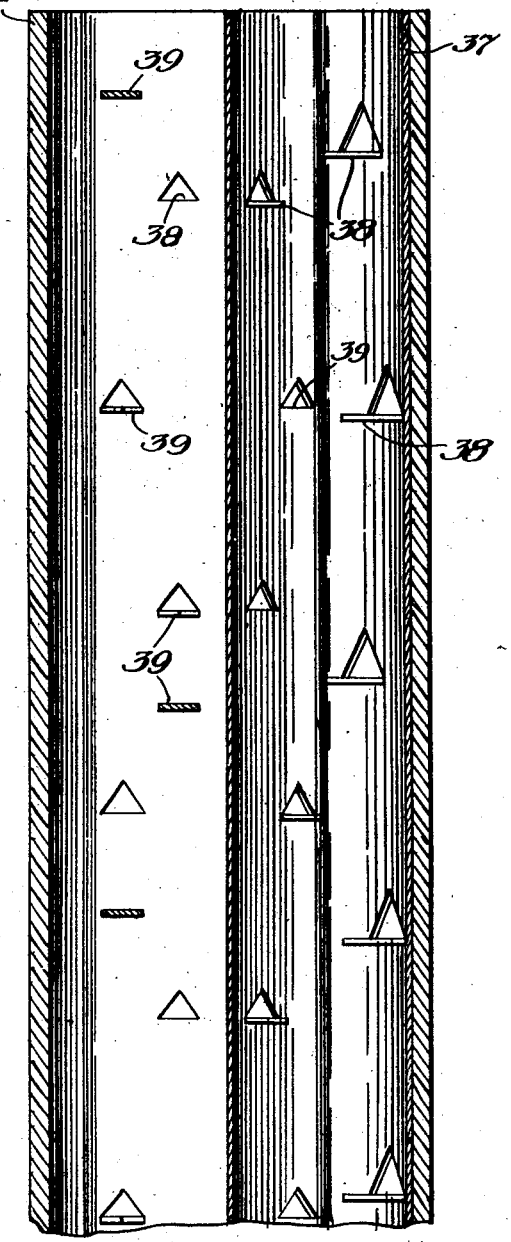
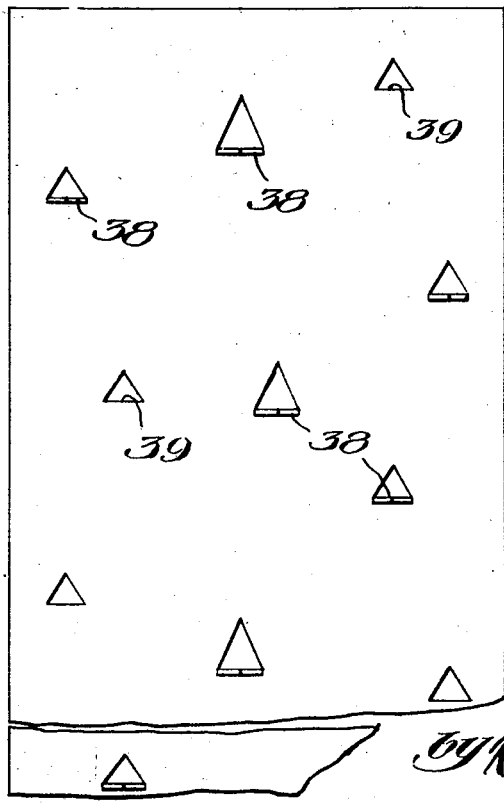

Feb. 20, 1934.  S. J. LONERGAN  1,947,606
WATER HEATED FLUE
Filed Oct. 17, 1929   6 Sheets-Sheet 5
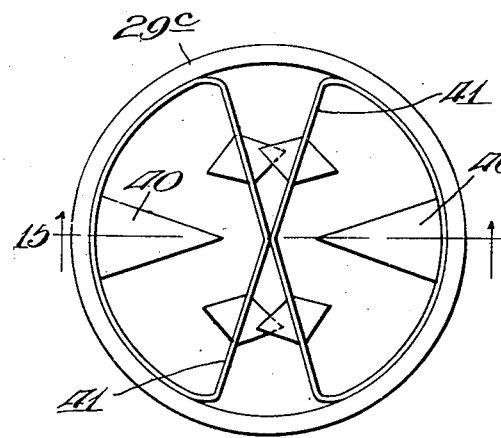
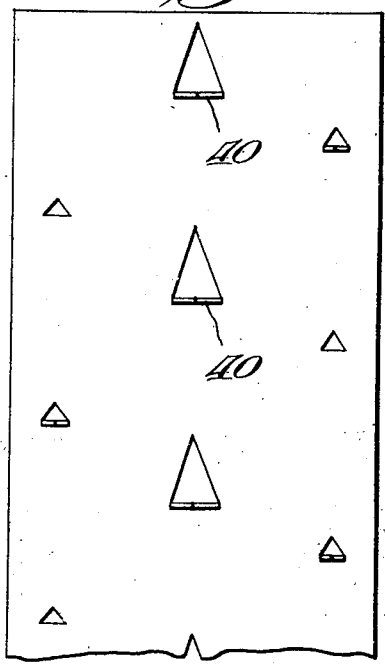
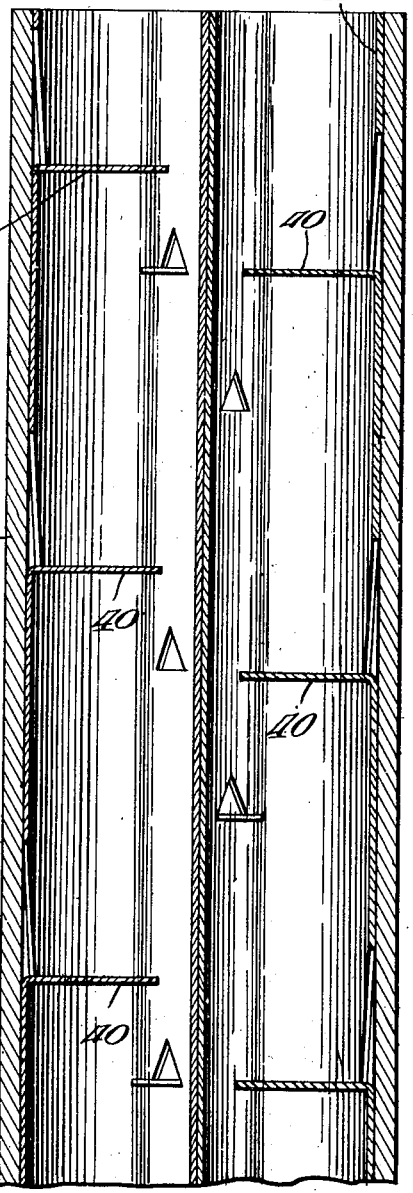

Feb. 20, 1934.  S. J. LONERGAN  1,947,606
WATER HEATED FLUE
Filed Oct. 17, 1929   6 Sheets-Sheet 6
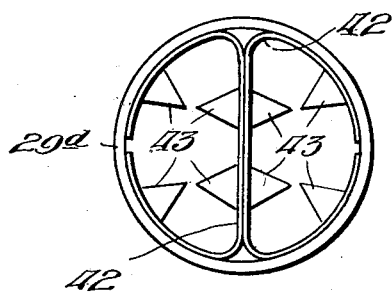
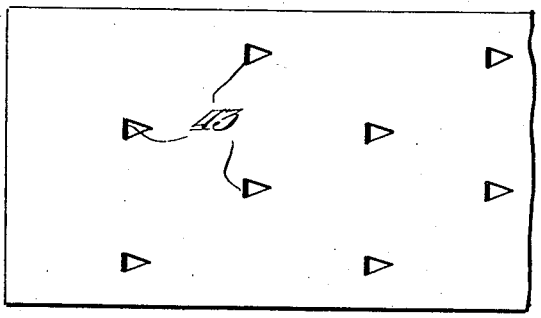
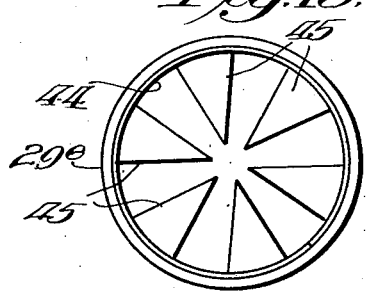
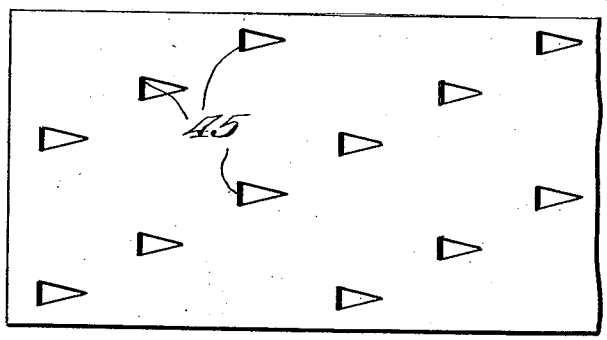
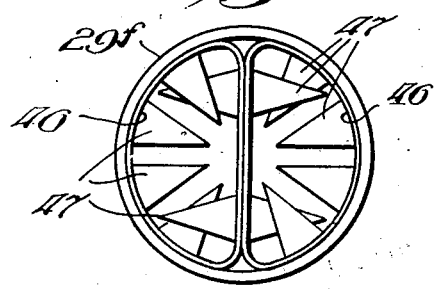
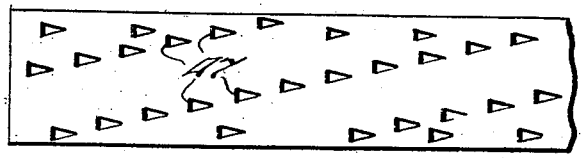

Patented Feb. 20, 1934

1,947,606

UNITED STATES PATENT OFFICE 1,947,606

WATER HEATER FLUE

Simon J. Lonergan, La Porte, Ind., assignor to Bastian-Morley Company, La Porte, Ind., a corporation of Indiana Application October 17, 1929. Serial No. 400,201

19 Claims. (Cl. 122—17)

This invention relates to water heating apparatus of a character which embodies a storage tank, a combustion chamber, a burner or other heating means and a flue which passes through the tank in contact with the water therein; and it has to do particularly with a novel form of flue structure.

In a heater of the foregoing type, the character and amount of the heating surface which is subjected to the radiant heat from the heating means and the hot flue gases plays a very large part in the efficiency obtained in the method of operation of the heater. The amount of heating surface should be such as to extract a maximum amount of heat from the hot gases, and this surface should be capable of rapid transmission of the heat to the water. My invention provides such a desirable arrangement in a simple and inexpensive manner, and without increase in the over-all size of the flue structure.

In the ordinary flue, the heat absorbing and radiating flue wall represents the actual available heating surface, and this is determined obviously by the circumference and length of the flue, both of which are of necessity limited in dimensions and present definite limitations on the amount of heating surface available. Further, in the ordinary flue of the foregoing character, as the hot gases pass through the flow path formed by the flue, transmission of heat from the gases through the flue wall results in a concentric stratification of the flue gases with respect to both temperature and velocity. The outer strata (adjacent the flue wall) as it gives up its heat to the water through the flue wall, becomes a cool, slow-moving film which insulates the flue wall from the inward flue gases somewhat similarly to dead air insulation. The presence of this insulating film, therefore, results in a sluggish transfer of heat from the hot gases in the central portion of the flue through the flue wall. The hot gases in the central portion of the flue or flow path, which are in rapid upward motion, pass out retaining the greater part of their heat content. This occasions considerable loss of heat and is attendant to low efficiency in operation of the heater.

My invention further has to do with the elimination of the foregoing objectionable conditions. More particularly, another object of my invention is to provide a flue structure of such construction that all of the hot flue gases in their exit will be so deflected and distorted in their travel through the flow path that every portion of the heating surface or heat absorbing and radiating wall will be scrubbed and scoured by the hot gases, thereby providing against any tendency of the hot gases to stratify and form dead air or cooler air insulating films along the heating surface with the result that the hot gases will be of substantially uniform temperature throughout the cross sectional area of the flow path at any given point therein. By such arrangement, the hot gases from the center of the flue are deflected laterally toward the flue wall so as to commingle with gases from which heat has been extracted so that the hotter gases are constantly bathing the flue wall heating surface and giving up heat therethrough to heat the water. In this manner, a maximum amount of the heat in the flue gases is transmitted by conduction to the water and the efficiency of this method of heating is increased to a high and practicable point.

Still another object is to provide for an increased amount of heating surface within the flue structure or flow path, such surface being that amount necessary to absorb practically the maximum amount of heat from the flue gases, and this heating surface is of such material and is so constructed that it is capable of transmitting the heat absorbed rapidly and directly to the water in the tank. More particularly, my method of heating provides for the division of the main flue-way or stream into a plurality of independently-acting flue-ways or the streams which, in turn, segregate the hotter strata of gases passing upwardly through the flue into smaller and individually effective hot sub-streams without destroying the peripheral configuration of the main stream. Each of these independent flue-ways is provided with a plurality of heat-absorbing projections or bodies extending into the several flue-ways in the path of the flue gases, and these projections or bodies are arranged to deflect and commingle the hot gases as hereinabove mentioned.

An additional object of my invention is to provide a flue structure of the character mentioned in the preceding paragraph which does not offer undue restriction to the flow of the gases through the flue and which thereby does not cause a stifling effect on the burner, which, as it is well known, would otherwise tend to lower the efficiency of the burner and would counteract the desirable results sought and obtained by my present invention.

A more specific object of my invention is to provide a flue structure having a plurality of flue-way forming members or bodies inserted with a main flue-way and integrally joined thereto and to each other, by galvanizing or in an equivalent manner to form an uninterrupted flow path; each of which tubular members is formed of a single blank having heat-absorbing fins or projections struck therefrom at substantially right angles thereto. It will be noted that these members or bodies will absorb heat from the hot gases in addition to that absorbed by the flue wall, and this additionally absorbed heat will be conducted to the flue wall through one or more uninterrupted flow paths possessing high heat conducting characteristics substantially throughout the entire travel of the hot gases through the flue or flow path. These blanks are finally formed to a cross-sectional shape similar to the shape of a sector of a cylinder having a radius approximately equal to the radius of the main flue-way, whereby when the formed blanks are inserted in the main flue-way the projections struck therefrom extend laterally into the several separate flue-ways formed by such members.

Still another object of my invention is to provide a novel method for forming a flue structure having the foregoing general characteristics, which method includes integral joinder of the flue and the tubular inserts by galvanizing at the time the tank as a whole is galvanized or otherwise similarly treated, whereby there is formed a metal bond between the flue parts providing integral flue structure of maximum heating surface which provides for direct transfer of the heat from the flue gases to the water in the tank through the flue wall.

Other objects and advantages of my invention will become apparent as this description progresses and by reference to the drawings, wherein:

Figure 1 is a vertical sectional view, with some parts in elevation, of one form of water heater embodying a flue structure formed in accordance with my invention;

Fig. 2 is a plan view of a portion of a blank from which one of the tubular inserts mounted within the flue are formed;

Fig. 3 is a top plan view showing the blank of Fig. 2 formed to tubular shape for insertion of the same in the flue;

Fig. 4 is a top plan view of the flue structure with the tubular inserts assembled therein prior to integral joinder of the same to the flue;

Fig. 5 is a top plan view similar to Fig. 4 illustrating, conventionally, the flue structure after integral joinder of the tubular inserts to the flue;

Fig. 6 is a vertical section taken substantially on line 6—6 of Fig. 4;

Fig. 10 is a top plan view of still another form of flue structure formed in accordance with my invention;

Fig. 11 is a plan view showing the form of blank from which the tubular inserts of the flue of Fig. 10 are formed;

Fig. 12 is a vertical section taken substantially on line 12—12 of Fig. 10;

Fig. 13 is a top plan view of a further form of flue structure formed in accordance with my invention;

Fig. 14 is a plan view showing the form of blank used in forming the tubular inserts of the form shown in Fig. 13;

Fig. 15 is a vertical sectional view taken substantially on line 15—15 of Fig. 13;

Figure 7:
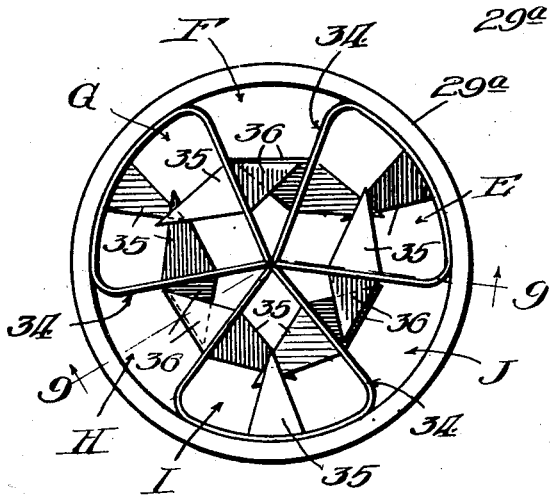
Fig. 7 is a top plan view of another form of flue structure formed in accordance with my invention.

Figs. 16, 18 and 20 are top plan views of additional flue structures embodying my invention; and Figs. 17, 19 and 21 are reduced plan views of portions of blanks for forming the inserts of the flues shown in Figs. 16, 18 and 20, respectively Referring particularly to the heater structure shown in Fig. 1, it comprises a storage tank 20 having its side wall 20$^a$ extended downwardly beyond its bottom 20$^b$ as at 20$^c$ to provide a combustion chamber 21. The wall 20$^a$, 20$^c$ of the tank is surrounded by a shell 22 which provides a space between the shell and the tank wall for receiving an insulating material 23. A burner 24 which may take any desirable form is disposed within the combustion chamber 21 and the flow of the combustible fuel to this burner is controlled by a thermostat device 25 which is under the control of the temperature of the water in the tank 20 as will be well understood. This thermostat device may take any desirable form which is adapted to cut off or reduce the flow of fuel to the burner when the temperature of the water in the tank reaches a predetermined point and which will cut in or increase the flow of fuel to the burner when the temperature of the water in the tank has been lowered to a predetermined point. The tank is provided with the usual cold water inlet 26, service outlet 27 and drain 28.

A flue structure, having, preferably, an open-ended cylindrical wall 29, passes centrally through the tank 20 in contact with the water therein. This flue communicates with the combustion chamber 21 for carrying hot gases therefrom as is customary. The flue provides a water heating surface which is employed effectively to greatly increase the efficiency of the water heating structure, as will now be described.

As hereinabove pointed out, the principal purpose of my invention is to provide a flue structure which will have a maximum amount of heating surface adapted for picking up and transmitting to the water a maximum amount of the heat from the hot flue gases to the water—all without impairing the efficiency of the heater, or parts thereof, in other respects. I accomplish this in an exceedingly simple and inexpensive way as follows:

Generally speaking, I mount within the cylindrical flue a plurality of tubular inserts which are so shaped as to form independent flue-ways through the flue structure, greater in number than the tubular inserts, and these inserts are finally integrally joined to the flue wall 29 to provide a single continuous heat transferring surface free of breaks, joints or the like which would occasion loss in heat conduction, as will be well understood. Specifically, with reference to the form in Figs. 2 to 6, inclusive, where I employ two of the foregoing tubular inserts, I first take a flat blank of metal (Fig. 2) of proper length and width and strike therefrom in staggered vertical row formation a plurality of triangularly-shaped fins or projections 30, 31 and 32. The projections 30 and 31 all extend from the blank at substantially right angles thereto and from the same side thereof, while projections 32 extend in the same manner but from the opposite side of the sheet for a purpose which will become obvious hereinafter. It will be noted that the projections 31 are obliquely disposed on the blank relative to the projections 30; but it will be understood that all of these projections 30, 31 may extend in the same manner, either obliquely or horizontally, without departing from my invention. In the arrangement of the projections in the vertical rows on the sheet, no two of the projections are in horizontal alinement, each of the projections being staggered with respect to the other of the projections on that same sheet. After the projections have been formed on the blank as shown in Fig. 2, this blank is formed in any desired manner to the shape illustrated in Fig. 3 with the projections 30, 31 disposed within the formed tubular space, and the projections 32 projecting from the outside of the tube wall. It will be noted that the tubular form given the blank is generally triangular in cross-section so that it takes generally the shape of a sector of a cylinder, each sector being greater than ¼ and less than ½ the cylinder space, and its curved wall portion 33 being of the shape of the inner surface of the flue wall 29. With this arrangement, when the pair of these tubular inserts (Fig. 3) is placed within the cylindrical flue with their apices adjacent each other four independent flue spaces, indicated by the letters A, B, C and D are formed (Fig. 4). The projections 30 and 31 extend into the respective flue spaces A and B within the tubes while the projections 32 extend into the flue spaces C and D, respectively, between the tubes. The opposed projections 32 on the opposed tubular inserts in the spaces C and D are so arranged that they are in staggered relation to each other (Figs. 4 and 5). The projections 30 and 31 are so arranged that, when the tubular inserts are formed, a relatively small and unrestricted vertical flue space is provided at the center of the flue-ways A and B so that while the hot gases are commingled and distorted, undue restriction of the upward flow of hot gases is not offered. The projections 32 in the flue spaces C and D are also so located with respect to each other than vertical flue spaces are provided in these particular flue-ways.

After the tubular inserts have been placed within the flue, they are integrally joined to the flue wall 29 to insure a direct heat flow communication between the heat-absorbing projections 30, 31, 32, the tubular inserts and the flue wall to the water, there being no joint surfaces left to occasion loss of heat in travel to the water. This is accomplished by providing a metal bond between the flue wall 29 and the parts carried thereby, and I, preferably, provide this metal bond by galvanizing, or similarly treating, the entire unit.

It is quite customary, for well known reasons, to assemble the heater structure including the storage tank and flue and then to finally galvanize the entire structure. The tubular inserts, according to my invention, may be galvanized along with the entire heater structure. It will be understood, however, that this metal bonding may be accomplished by galvanizing the flue structure as a separate unit, if so desired.

The galvanizing may be carried out in any well known manner without departing from my invention. For example, I have found that this may be readily accomplished as follows: The tank with its flue having the tubular inserts mounted therein is immersed in a pickling bath of sulphuric acid which is heated to approximately 150° Fahrenheit. From this bath the entire unit is transferred into a bath of cold muriatic acid. This completes the pickling process. The tank unit is next placed in a drying furnace and allowed to remain long enough enough to become coated; and it is then immersed in a bath of molten zinc which is at a temperature of approximately 860° Fahrenheit. This completes the galvanizing process.

In operation of the structure so far described, the hot gases from the burner 24 pass from the combustion chamber 21 upwardly into the flue. The gases entering the flue are divided, so to speak, into separate streams and are caused to pass upwardly through independently acting flue-ways (four in the form of Figs. 2–6) so that the center strata of gases, which is the hotter, is broken up and passes in part through all of the flue-ways. Thus the hotter gases are moved nearer to the flue wall through which final transfer of heat to the water takes place. As the gases pass through the independent flue-ways, the respective projections cause the same to take a tortuous path whereby all of the gases are commingled and the formation of cooler, insulating gas along the flue wall surface is eliminated. The staggered fins or projections break up the flue gases into fine streams which are deflected and distorted so that they scrub and scour the entire flue wall surface intimately and at a slow, but non-obstructing, rate so that the gases are caused to give up a maximum amount of heat to the flue wall which is transmitted rapidly to the water in the tank. The projections, as well as the tubular inserts, serve as additional heating surface. Being disposed directly in the path of the hot gases, these projections pick up an additional amount of heat and, being integrally associated with the flue wall by means of the tubular inserts, transmit this heat directly to the flue wall and water. The tubular inserts, their projections and the flue wall are formed of any suitable material adapted for a rapid transfer of heat from the hot gases to the water. The integral metal bond between the tubular inserts and the flue wall provided by the galvanizing of the same, is also a rapid transmitter of heat and does not interfere in that respect, but on the other hand, aids materially in the transfer of the heat from the tubular inserts and the projections through the flue wall and water.

The highly efficient heat-absorbing and heat-transmitting qualities of the foregoing arrangement has been clearly demonstrated in practical tests wherein it has been found that the temperature of the discharging flue gases, as compared to ordinary flue structures, baffled or otherwise, has been lowered 200° or more.

Figure 8:
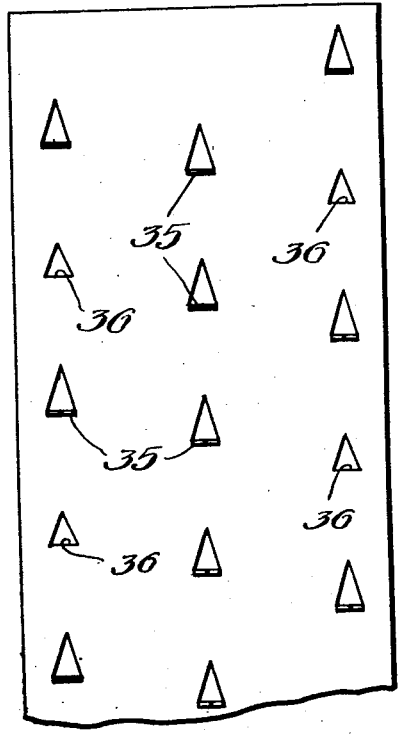
Fig. 8 is a plan view showing the form of the blank from which the tubular inserts of the flue of Fig. 7 are formed.
Figure 9:
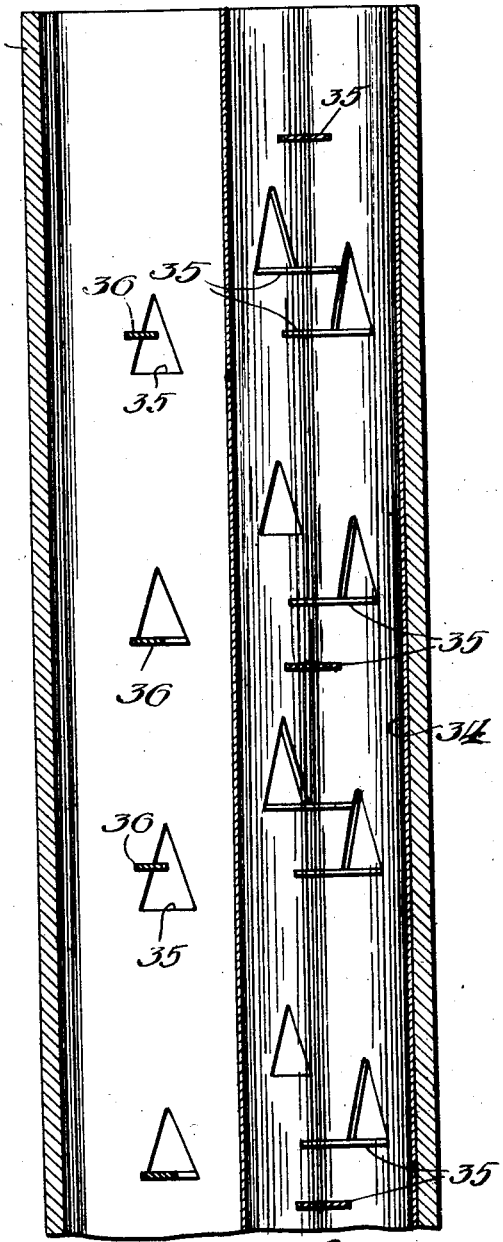
Fig. 9 is a vertical sectional view taken substantially on line 9—9 of Fig. 7.

In Figs. 7, 8, and 9, I have shown another form of flue structure embodying my invention. In this form, three tubular inserts 34 are employed, each of which is of approximately triangular shape in cross section and takes the shape of a smaller sector of a cylinder as compared to the inserts of the form in Figs. 2 to 6, inclusive. In this form, the tubular inserts are formed from a single blank of material (Fig. 8) having a plurality of vertical rows of fins or projections 35 struck from one side thereof and a plurality of similar projections 36 struck from the opposite side thereof. All of these projections on each tube blank are arranged in staggered relation with respect to each other. These inserts are placed within the flue 29ª so as to provide six flue-ways E, F, G, H, I and J. The projections 35 in the formed and mounted tubes 34 project inwardly of the flue-ways E, G, and I with their ends in overlapping and staggered relationship. The projections 36 in the flue-ways F, H and J extend inwardly toward each other in overlapping, staggered relationship, the corresponding projections 36 on the adjacent tubular inserts 34 being staggered so that no two of the projections in any of the flue spaces are in horizontal alinement with each other. By this arrangement, as in the form of Figs. 2 to 6, inclusive, the hot gases are segregated and pass through independently acting flue-ways, and the travel of these gases is deflected and distorted in a tortuous path so that all of the gases are commingled and the heating surfaces are intimately scrubbed by such gases to insure a maximum heat-absorption and transfer of the heat of the gases through the flue wall to the water in the tank. The tubular inserts are integrally joined to the flue wall by galvanizing, or in a similar manner, as in the form previously described. Otherwise, the operation of this form is the same as the form of Figs. 2 to 6, inclusive.

In Figs. 10, 11 and 12, I have shown a still further modification wherein I employ four tubular inserts 37 which provide eight independently-acting flue-ways K, L, M, N, O, P, Q and R. The inserts in this form are each formed from a blank (Fig. 11) of material having vertical rows of projections 38 struck from one side thereof and projections 39 struck from the other side thereof, the projections 38 in the tubular inserts, projecting inwardly into the flue-ways K, M, O, and Q and the projections 39 projecting into the other flue-ways between the inserts. All of the projections 38 are so arranged with respect to each other that each projection is staggered with respect to the adjacent projections 38 and all of the projections 39 on each insert are arranged in staggered relation and so arranged that the projections on the opposed insert extending into the same flue space lie in staggered relationship so that no two of the projections 38 or 39 are in horizontal alinement with each other. The inserts 37 are integrally joined to the flue wall 29ᵇ in the manner described in connection with the previous forms and the action of the projections and inserts and independently acting flues is the same in this form as in the previously-described forms.

The modification shown in Figs. 13, 14 and 15 is similar to the form of Figs. 2 to 6, inclusive, except that a single centrally located vertical row of projections 40 is employed instead of the two central vertical rows of projections 31 of the form of Fig. 2. These projections 40 are somewhat longer than the other projections 30, 31 and their action is similar to that described in connection with the form of Figs. 2 to 6, inclusive. In this form, I employ two similar inserts 41 which are integrally joined to the flue wall 29ᶜ as previously described.

The form shown in Figs. 16 and 17 is somewhat similar to that of Figs. 2 to 6, except as to the shape of the formed tubular inserts and the particular arrangement of the projections. Specifically, the tubular inserts 42 are each of semi-circular shape in cross-section, each taking up approximately one-half of the space within the flue wall 29ᵈ. This shape provides in each insert an increased wall surface in contact with the flue wall and an increased surface of each insert in abutting relation with the other insert as clearly shown in Fig. 16, as well as somewhat larger sub-flue-ways. In this form the projections 43 are all struck from the same side of the blank of Fig. 17 so as to all extend within the flue space within the formed insert. These projections are arranged in vertical rows with the projections in one row staggered with respect to the projections in the adjacent rows. The placement and formation of the projections in the several rows are uniform so that they also take a regular diagonal row formation whereby, when the blank is formed to the tubular shape shown the projections take a spiral-like row formation with the projections staggered with respect to each other to cause the gas to take a deflected and tortuous path for the accomplishment of the results hereinabove explained.

The form of Figs. 18 and 19 contemplates the use of only one tubular insert 44 within the flue wall or shell 29ᵉ. In this form the insert is formed from a single blank shown in Fig. 19, which has a plurality of triangularly-shaped projections 45 struck from one side thereof. These projections are arranged in six vertical rows, the rows of projections being uniformly spaced laterally and the projections in each of the rows being spaced uniformly vertically so that uniform diagonal rows of projections are formed. With this diagonal row formation, when the blank is formed to tubular shape (Fig. 18), the projections take a spiral row formation with each of the projections staggered with respect to the adjacent projections. This arrangement adds materially to the flue heating surface and so deflects and causes the gases to take such a tortuous path through the flue, without undue restriction, that maximum heating efficiency is obtained from the flue gases as hereinabove explained. The tubular insert 44 is integrally united to the flue wall or shell 29ᵉ by galvanizing as explained in connection with the previous forms.

An additional form is shown in Figs. 20 and 21. In this form two identical tubular inserts 46 are each formed from a blank such as shown in Fig. 21. These inserts take a semi-cylindrical shape similar to the shape of the inserts 42 of the form of Fig. 16. These inserts 46 are also intimately joined together and to the flue wall or shell 29ᶠ by galvanizing as explained in connection with previous forms, and for the purposes already fully set forth. Six vertical rows of equally spaced (vertically and laterally) projections 47 are struck from the same side of the blank so that, when the blank is formed to its tubular shape the projections extend horizontally into the flue-way provided by the insert. The projections are all so spaced that they are each staggered with respect to the adjacent projections for purposes obvious from the foregoing description with respect to the previously-described forms. Further, like in previous forms, the projections are so spaced that they take uniform diagonal row formation and, in the formed insert, take a somewhat spiral-row path. In this form some of the projections overlap each other, but in spaced, staggered relation as in the form of Figs. 4 and 7.

From the foregoing, I believe the advantages of my invention will be appreciated. By the greater utilization of the flue gases for heating purposes with an increased heating effect, the amount of fuel necessary for operation is materially reduced with a consequent reduction in cost of operation which is an exceedingly important factor in the use of structures of this character. In fact, my invention makes practical the use of heaters of this character in instances where the use of the same has heretofore been prohibitive from the operation cost standpoint.

It will be understood that while I have shown several forms of my invention, further changes in details and arrangement of parts may be made without departing from my invention as defined by the claims which follow.

I claim:

1. In water heater structure, a storage tank having provision for a combustion chamber therebeneath, an open-ended flue member passing through said tank and the liquid therein for carrying hot gases of combustion from said combustion chamber and providing a water heating surface, and means for increasing the heating surface of said flue which comprises a plurality of tubular members mounted in said flue in heat transfer contact with said flue member, said tubular members being of such shape as to provide through said flue member a plurality of independent flue ways greater in number than said tubular members, and means carried by said tubular members and projecting into all said flue ways for imparting turbulent motion to the gases and also serving for heat transfer.

2. In water heater structure, a storage tank having provision for a combustion chamber therebeneath, an open-ended flue member passing through said tank and having its wall in contact with the liquid therein for carrying hot gases of combustion from said combustion chamber and providing a water heating surface, and means for increasing the heating surface of said flue which comprises a plurality of members mounted in said flue and having their surfaces projecting to the center thereof, said latter members being of such shape as to provide through said flue member a plurality of separate, independent flue ways greater in number than said flue-way forming members, and a metal bond between said members and the wall of said flue member forming as a whole an integral flue structure with the walls of said flueway forming members in unbroken heat transmission communication with the water in said tank.

3. In a water heater structure, a storage tank having provision for a combustion chamber therebeneath, an open-ended flue member passing through said tank and the liquid therein for carrying hot gases of combustion from said combustion chamber and providing a water heating surface, and means for increasing the heating surface of said flue which comprises a plurality of tubular members mounted in said flue, said tubular members having the cross-sectional shape of a sector of a cylinder and being of a size less than one-half and more than one-quarter of the cross-sectional area of said flue member, thereby providing through said flue member a plurality of independent flue-ways greater in number than said tubular members.

4. In water heater structure, a storage tank having provisions for a combustion chamber therebeneath, an open-ended flue member passing through said tank and the liquid therein for carrying hot gases of combustion from said combustion chamber and providing a water heating surface, and means for increasing the heating surface of said flue which comprises a plurality of tubular members mounted in said flue, said tubular members being triangularly-shaped in cross-section with their apices abutting, their adjacent sides spaced apart, and their base portions abutting the wall of said flue thereby providing through and between said tubular members a plurality of independent flue-ways.

5. In water heater structure, a storage tank having provision for a combustion chamber therebeneath, an open-ended flue member passing through said tank and the liquid therein for carrying hot gases of combustion from said combustion chamber and providing a water heating surface, and means for increasing the heating surface of said flue which comprises a plurality of tubular members mounted in said flue, said tubular members being triangularly-shaped in cross-section with their apices abutting in said flue member and their base portions abutting the wall of said flue thereby providing a plurality of independent flue ways, and a metal bond between said tubular member bases and said flue member wall integrally joining said members for a direct unbroken conduction of heat from said tubular members through the wall of said flue member to the water in said tank.

6. In water heater structure, a storage tank having provision for a combustion chamber therebeneath, an open-ended cylindrical flue member passing through said tank and the liquid therein for carrying hot gases of combustion from said combustion chamber and providing a water heating surface, and means for increasing the heating surface of said flue which comprises a plurality of tubular members mounted in said flue, said tubular members being each of triangular shape in cross-section with their apices adjoining at the central portion of the flue and their base portions being shaped to the curvature of the interior wall of said flue member, and a metal bond between the apices of said tubular members and between said tubular member bases and the wall of said flue member integrally joining all said initially separate parts.

7. A flue structure adapted to be disposed within a liquid storage tank which comprises an outer wall member adapted to contact the water in the tank and which is hollow and open-ended for the passage of the hot gases therethrough, tubular members within said outer wall member and having integral metal bonding connection with said outer wall and providing within said wall member a plurality of independent flue ways, and a plurality of heat-absorbing projections on said tubular members which extend horizontally into the path traversed by the hotter gases passing through said flue ways, whereby the flue heating surface is increased and there is a direct, unbroken heat conduction path from the hot gases to the water in the tank through the flue structure.

8. A flue structure adapted to be disposed within the liquid storage tank which comprises an outer wall member adapted to contact the water in the tank and which is hollow and open-ended for the passage of the hot gases therethrough, means within said outer wall member and integrally bonded thereto and providing within said wall member an independent flue way, and a plurality of heat-absorbing projections forming an integral part of said means and which extend horizontally into the flue way into the path traversed by the hotter gases passing through said flue way, said projections being arranged in vertical rows with the projection in the several rows staggered with respect to each other so that gases passing through the flue way are caused to take a tortuous path.

9. A flue structure for a structure of the character described which comprises an outer wall adapted to contact the water to be heated, said wall providing a main flue-way, a plurality of tubes mounted in said flue-way and so shaped as to divide the same into a plurality of separated flue-ways greater in number than said tubes, said tubes each being formed from a metal blank having a plurality of projections or fins projecting therefrom in staggered formation so that no two of the projections on the same tube are in horizontal alignment, some of which projections extend from one side and the others from the opposite side of said blank, whereby said tubes as formed and inserted in said main flue-way present a plurality of staggered heat-absorbing projections which extend into the separate flue-ways formed thereby for increasing the flue heating surface and for causing the gases to take a tortuous path through the respective flue-ways.

10. A flue structure for a structure of the character described which comprises an outer wall adapted to contact the water to be heated, said wall providing a main flue-way, a plurality of tubes mounted in said flue-way and so shaped as to divide the same into a plurality of separated flue-ways greater in number than said tubes, said tubes each being formed from a metal blank having projections or fins projecting therefrom, some of which projections are projected from one side and the others from the opposite side, whereby said tubes as formed and inserted in said main flue-way present a plurality of heat-absorbing projections which extend into the separate flue-ways formed thereby, and a metal bond between said tubes and said outer wall integrally joining all said tubes and outer wall providing an unbroken heat-conduction path through said projections, tubes and outer wall to the water to be heated.

11. A flue structure for a structure of the character described which comprises an outer wall adapted to contact the water to be heated, said wall providing a main flue-way, a plurality of similar tubes mounted in said main flue-way dividing said main flue-way into a plurality of independent flue-ways within and between said tubes, each of said tubes being formed from a single blank of metal, each said blank having projected therefrom a plurality of angularly disposed fins, some of which are projected from one side of the blank and the others from the other side of the blank, all of said fins on the same blank being staggered with respect to each other, whereby in all the flue-ways between and within said tubes said fins will project in the path of the gases passing therethrough, and means metal-bonding all said tubes to each other and to said outer wall.

12. In water heater structure, a storage tank having provision for a combustion chamber therebeneath, an open-ended flue member passing through said tank and the liquid therein for carrying therethrough hot gases of combustion from said combustion chamber and providing a water heating surface, and means for increasing the heating surface of said flue which comprises a plurality of tubular members mounted in said flue, said tubular members providing a plurality of independent flue-ways, and a metal bonding agent between said tubular members and said flue member wall integrally joining said members for a direct unbroken conduction of heat from said tubular members through the wall of said flue member to the water in said tank.

13. In water heater structure, a storage tank having provision for a combustion chamber therebeneath, an open-ended cylindrical flue member passing through said tank and the liquid therein for carrying hot gases of combustion from said combustion chamber and providing a water heating surface, and means for increasing the heating surface of said flue which comprises a tubular member mounted in said flue, said tubular member being of triangular shape in cross-section with its apex at the central portion of the flue and its base portion being shaped to the curvature of the interior wall of said flue member, and a metal bond between said tubular member base and the wall of said flue member integrally joining all said initially separate parts.

14. In water heater structure, a storage tank, means forming a combustion chamber, an open ended flue casing passing through the liquid in said tank and for carrying hot gases of combustion from said combustion chamber and providing a water heating surface, and means for increasing the heating surface of said flue casing which comprises a plurality of members mounted within said flue casing and having the cross-sectional shape of a sector of a cylinder of size less than one-half of a cylinder, the sum of the central angles of said members being less than 360° thereby providing through said flue casing a plurality of separate flue ways greater in number than said members.

15. In water heater structure, a storage tank, means forming a combustion chamber, an open-ended flue casing passing through the liquid in said tank and for carrying hot gases of combustion from said combustion chamber and providing a water heating surface, means for increasing the heating surface of said flue casing which comprises a plurality of members mounted within and engaging the wall of said flue casing and having the cross-section shape of a sector of a cylinder of size less than one-half of a cylinder, the sum of the central angles of said members being less than 360° thereby providing through said flue casing a plurality of separate flue ways greater in number than said members, and a metal bonding agent intimately joining said members and flue casing for continuous, unbroken conduction of heat through said members to said casing wall.

16. A flue structure comprising a chamber to contain fluid to be heated, a tubular heat absorbing and radiating wall extending through said chamber in heat exchange relation with the fluid and adapted to form a flow path for hot gases, heat absorbing means positioned in the bore of said wall for dividing the flow path into a plurality of independent sub flow paths, means carried by the aforesaid means for preventing stratification of all of the gases passing through the sub flow paths, and means for providing an uninterrupted heat path possessing high heat conducting characteristics between said heat absorbing means and said tubular wall.

17. A flue structure comprising a chamber to contain fluid to be heated, a tubular heat absorbing and radiating wall extending through said chamber in heat exchange relation with the fluid and adapted to form a flow path for hot gases, heat absorbing means positioned in the bore of said wall for dividing the flow path into a plurality of independent sub flow paths, heat absorbing means carried by the aforesaid means for preventing stratification of all of the gases passing through the sub flow paths, and means for providing an uninterrupted heat path possessing high heat conducting characteristics between said heat absorbing means and said tubular wall.

18. A flue structure comprising a chamber to contain fluid to be heated, a tubular heat absorbing and radiating wall extending through said chamber in heat exchange relation with the fluid and adapted to form a flow path for hot gases, tubular heat absorbing means positioned in the bore of said wall for dividing the flow path into a plurality of independent sub flow paths, means carried by the walls of said tubular means for preventing stratification of all of the gases passing through the sub flow paths, and means for providing an uninterrupted heat path possessing high heat conducting characteristics between said heat absorbing means and said tubular wall.

19. A flue structure comprising a chamber to contain fluid to be heated, a tubular heat absorbing and radiating wall extending through said chamber in heat exchange relation with the fluid and adapted to form a flow path for hot gases, tubular heat absorbing means positioned in the bore of said wall for dividing the flow path into a plurality of independent sub flow paths, heat absorbing means carried by the walls of said tubular means and projecting into the various sub flow paths to prevent stratification of all of the gases passing therethrough, and a surface metal bond between some of the walls of said tubular means and the tubular heat absorbing and radiating wall for providing an uninterrupted heat path possessing high heat conducting characteristics.

SIMON J. LONERGAN.